(12) United States Patent
Mayle et al.

(10) Patent No.: US 11,740,170 B2
(45) Date of Patent: Aug. 29, 2023

(54) METHOD FOR OPERATING A MEASURING DEVICE USED TO DETERMINE A FLUID VARIABLE, AND MEASURING DEVICE

(71) Applicant: DIEHL METERING GMBH, Ansbach (DE)

(72) Inventors: Michael Mayle, Ansbach (DE); Andreas Madinger, Ansbach (DE); Alexander Hofmann, Sachsen (DE); Markus Schmidt, Petersaurach (DE)

(73) Assignee: Diehl Metering GmbH, Ansbach (DE)

( * ) Notice: Subject to any disclaimer, the term of this patent is extended or adjusted under 35 U.S.C. 154(b) by 284 days.

(21) Appl. No.: 17/074,801

(22) Filed: Oct. 20, 2020

(65) Prior Publication Data
US 2021/0123846 A1    Apr. 29, 2021

(30) Foreign Application Priority Data
Oct. 23, 2019    (DE) .............................. 102019007359

(51) Int. Cl.
*G01N 11/16*    (2006.01)
*G01N 29/036*    (2006.01)
*G01N 29/22*    (2006.01)

(52) U.S. Cl.
CPC ........... *G01N 11/16* (2013.01); *G01N 29/036* (2013.01); *G01N 29/22* (2013.01)

(58) Field of Classification Search
CPC ...... G01N 11/16; G01N 29/036; G01N 29/22; G01F 25/10; G01F 1/662
See application file for complete search history.

(56) References Cited

U.S. PATENT DOCUMENTS

| 6,178,827 | B1* | 1/2001 | Feller | G01F 1/662 |
| | | | | 73/861.27 |
| 6,442,999 | B1* | 9/2002 | Baumoel | G01F 1/66 |
| | | | | 73/592 |
| 2010/0095782 | A1* | 4/2010 | Ferencz | G01F 1/667 |
| | | | | 73/861.28 |
| 2020/0209031 | A1* | 7/2020 | Dabak | G01F 1/668 |

FOREIGN PATENT DOCUMENTS

| DE | 102009046561 A1 | 5/2011 |
| EP | 2725353 B1 | 7/2017 |

* cited by examiner

*Primary Examiner* — Tarun Sinha
(74) *Attorney, Agent, or Firm* — Laurence A. Greenberg; Werner H. Stemer; Ralph E. Locher (57) ABSTRACT

A method operates a measuring device used to determine a fluid variable. The measuring devices contains a vibration transducer driven to excite a wave in the fluid due to a test excitation signal. The wave is guided along a propagation path back to the vibration transducer or to an additional vibration transducer, thereby exciting the (additional) vibration transducer to vibrate. An output signal relating to this vibration is acquired, and a frequency of that segment of the output signal that lies in an analysis interval is determined. The analysis interval starts once the driving of the vibration transducer to excite the wave has finished, and/or once a maximum of the amplitude of the vibration is reached. The determination of the fluid variable is performed based on the determined frequency. An error message or a notification is output to a user and/or to a device external to the measuring device.

12 Claims, 4 Drawing Sheets

METHOD FOR OPERATING A MEASURING DEVICE USED TO DETERMINE A FLUID VARIABLE, AND MEASURING DEVICE

CROSS-REFERENCE TO RELATED APPLICATION

This application claims the priority, under 35 U.S.C. § 119, of German application DE 10 2019 007 359, filed Oct. 23, 2019; the prior application is herewith incorporated by reference in its entirety.

BACKGROUND OF THE INVENTION

Field of the Invention

The invention relates to a method for operating a measuring device which is used to determine a fluid variable relating to a fluid and/or to a fluid flow of the fluid, and which contains a measuring container that holds the fluid and/or through which the fluid flows, and a vibration transducer arranged on the measuring container. The invention also relates to a measuring device for determining a fluid variable relating to a fluid and/or to a fluid flow of the fluid.

Ultrasonic meters are one possible way of detecting a flow rate or other measured variables relating to a fluid. These meters use at least one ultrasonic transducer in order to couple an ultrasonic wave into the fluid flowing through the measurement tube, which wave is guided along a straight path, or after several reflections at walls or special reflection elements, to a second ultrasonic transducer. A flow velocity through the measurement tube can be determined from a transit-time difference between the transit times of the ultrasonic wave between the ultrasonic transducers when transmitter and receiver are interchanged. For other measurement tasks, for instance for identifying the fluid from a speed of sound in the fluid, it may even be sufficient to use just one ultrasonic transducer, to which the wave is guided back.

In order to be able to integrate such a measuring device easily into a fluid circuit, it is advantageous if this device has a space-saving design and achieves low energy consumption, for instance making battery operation possible over longer time intervals. If a signal having a specific frequency is used here to excite the ultrasonic wave, the amplitude of the received signal, for given dimensioning of the vibration transducers and given excitation power, typically depends on this frequency, where particularly large signal amplitudes of the receive signal can be reached at certain resonant frequencies of the system. In order to achieve high signal quality and hence also high measurement accuracy, it can therefore be advantageous to operate the vibration transducer(s) at, or at least close to, the resonant frequency of the measurement system. As a result of component tolerances, associated resonant frequencies, and in particular also the response thereof to changes in the measurement parameters, for instance to a change in temperature, may vary between measuring devices that, in principle, are of identical construction, or may alter as part of the ageing process of the measuring device.

For the purpose of automatically adjusting an operating point of an operating frequency, European patent EP 27 25 353 B1 proposes varying a drive frequency of an ultrasonic sensor at intervals, and to determine for each interval the strength of the signal received by the ultrasonic receiver. The drive frequency is varied until the received signal strength has reached a maximum. Since this requires performing a relatively large number of measurement procedures until the operating point can be determined, adjusting the operating point is relatively energy-intensive, and in this time interval a flow-rate measurement, or at least an optimum flow-rate measurement, is not possible.

BRIEF SUMMARY OF THE INVENTION

Therefore the object of the invention is to define a method for operating a measuring device, in which method an excitation signal used in the measurement, in particular the frequency of said excitation signal, can be determined with little expenditure of energy and/or time, and/or a change in resonant frequencies can be easily identified.

The object is achieved according to the invention by a method of the type mentioned in the introduction. A control device of the measuring device drives the vibration transducer to excite a wave in the fluid by means of a test excitation signal. The wave is guided along a propagation path back to the vibration transducer or to at least one additional vibration transducer of the measuring device, which additional vibration transducer is arranged on the measuring container, thereby exciting the, or the additional, vibration transducer to vibrate. The control device acquires an output signal relating to this vibration and determines a frequency of that segment of the output signal that lies in an analysis interval. The analysis interval starts once the driving of the vibration transducer to excite the wave has finished, and/or once a maximum of the amplitude of the vibration is reached or exceeded. The determination of the fluid variable is performed on the basis of the determined frequency, and/or on a trigger condition being fulfilled, the fulfilment of which depends on the determined frequency, an error message or a notification is output to a user and/or to a device external to the measuring device, and/or the measuring device is placed in a fault condition in which, in particular, determining the fluid variable is not performed.

If the wave were excited by a very wideband excitation signal, then a vibration of the receiving vibration transducer would be excited having a dominant frequency equal to the resonant frequency of the system. The dominant frequency could be determined, for example, as the maximum of a power density spectrum or else using a frequency counter. In order to achieve robust transmission of the vibration from the vibration transducer to the additional vibration transducer or along the propagation path back to the same vibration transducer, however, a relatively narrowband excitation signal should be used, for instance a periodic signal that defines the dominant frequency of the excitation and that is modulated by an amplitude envelope. The result of this, however, is that a corresponding spectral distribution of the excitation signal is imposed on the output signal, and therefore when analyzing the entire output signal, the dominant frequency of the excitation signal, or an intermediate frequency lying between this frequency and the actual resonant frequency, is typically determined as the apparent resonant frequency.

In the context of the invention, it has been found that this problem can be avoided or significantly reduced by considering solely an analysis interval, which starts once the driving of the vibration transducer to excite the wave has finished or once a maximum of the amplitude of the vibration is reached or exceeded. This results from the fact that during the excitation of the vibration by the driving of the vibration transducer or by an incident wave, i.e. before the stated times, forced vibration of the, or of the additional, vibration transducer takes place, the frequency of which is defined by the frequency of the external excitation. On the other hand, once the driving of the vibration transducer to excite the wave has ended, in particular if an additional delay is allowed for an expected transit time of the wave back to the vibration transducer or to the additional vibration transducer, or once the maximum of the amplitude of the vibration is reached, it can be assumed that at least for most of the analysis interval the, or the additional, vibration transducer is vibrating freely, and therefore the spectrum of the vibration is dominated by the resonant frequency of the system or of the, or the additional, vibration transducer. By solely considering the output signal within the analysis interval, an influence of the spectrum of the test excitation signal on the determined spectrum of the output signal can thus be at least largely eliminated, and therefore a frequency of the output signal in the analysis interval, in particular a resonant frequency of the system or of the, or the additional, vibration transducer, can be determined with good accuracy by a single measurement. It is thereby possible in particular to tune an excitation frequency to a determined resonant frequency of the system or in particular of the vibration transducers.

The determined frequency can be in particular the dominant frequency of the output signal in the analysis interval. Various options for determining the dominant frequency are explained in greater detail later. As part of the method according to the invention, in particular an excitation frequency of the measurement excitation signal is defined on the basis of the determined frequency. The excitation frequency may be identical to the determined frequency, may be offset therefrom by a fixed offset, may be determined using a lookup table, or suchlike. The frequency may be in particular the frequency of a periodic signal, for instance of a sine wave or square wave. The periodic signal can be amplitude-modulated by an envelope, for example a square-wave function of defined length, a cosine-squared window or Blackman-Harris window, or the like.

As explained in greater detail later, the determined frequency is preferably used to define an excitation signal for the vibration transducer(s) that is used in determining the fluid variable. Additionally or alternatively, a parameter or correction factor that depends on the determined frequency can be taken into account when determining the fluid variable, in particular when processing measurement data. For example, the parameter or correction factor can be defined from a lookup table, for instance that has been obtained empirically. A correction factor can be used, for example, to correct for effects resulting from ageing of the measuring device or from environmental conditions, for instance a temperature, that also affect the resonant frequencies or dominant frequencies in the system.

In addition to, or as an alternative to, determining the fluid variable on the basis of the determined frequency, under certain conditions a notification can be given or an error message can be output on the basis of the determined frequency. The trigger condition for giving the notification or for the error message may be fulfilled, for example, when the determined frequency lies outside a target range, or a deviation from a target value is greater than a limit value. For example, the resonant frequency of the measuring device, which can be determined as the determined frequency, may change as a result of ageing or damage to the, or the additional, vibration transducer. Slight changes to the resonant frequency can be counterbalanced by adjusting the measurement excitation signal. If, however, deviations arise that are too severe, or the size of the deviation indicates that the measurement accuracy might suffer, for instance because of ageing or damage to the measuring device, then a user can be notified of this, or a suitable notification or a suitable error message can be given in particular wirelessly to a device external to the measuring device, for instance in order to recommend that the measuring device is serviced or certain components are replaced. A notification can be given by a notification device mounted on the measuring device, for instance by a loudspeaker, a display or the like. It is also possible for example, however, for the purpose of giving notification to send a suitable signal via a wireless radio link, for instance to a central device or a monitoring system of a supplier or of the manufacturer of the measuring device or to a mobile phone of the user. Additionally or alternatively, on the trigger condition being fulfilled, the measuring device can be switched into a fault condition. It is possible that in the fault condition, no measured values are acquired, or that measurement data acquired in the fault condition is labelled as erroneous. This can prevent the acquisition of corrupted measurement data, or of measurement data for which the accuracy cannot be vouchsafed, when the determined frequency indicates a significant alteration in the properties of the measuring device.

If the frequency is determined as explained above at a plurality of instants spaced apart in time, it may also be advantageous to store and/or to analyze for diagnostic purposes the variation in the determined frequency. For example, characteristic changes in frequency towards the end of the life cycle of vibration transducers can be identified, or a step change in frequency can be identified that may indicate, for example, damage to a vibration transducer, for instance a crack or the like.

In the following explanations and examples, the focus is on measuring devices that have vibration transducers which are used to couple waves directly into the fluid, and to receive waves directly therefrom. The teaching according to the invention, however, can be applied equally to measuring devices in which coupling the wave into and/or out of the fluid is performed indirectly via a wall of the measuring container, for instance a tube wall. For example, the vibration transducer and/or the additional vibration transducer can be configured first to excite a guided wave in a wall of the measuring container, which in turn couples the wave into the fluid. A Lamb wave, for example, can be coupled into the wall of the measuring container as the guided wave.

Determining the fluid variable depends on the determined frequency preferably at least to the extent that a measurement excitation signal, which the control device outputs to the, or the additional, vibration transducer as part of determining the fluid variable, is defined on the basis of the determined frequency. In particular, an excitation frequency of the measurement excitation signal can be defined on the basis of the determined frequency, and set to this frequency, for example. It can hence be achieved, for instance, that the excitation takes place at a resonant frequency of the vibration transducer(s). This makes it possible to achieve sufficient signal amplitudes with a relatively small input of energy, thereby ensuring that the measuring device has low energy consumption.

The control device can determine digital measurement data on the basis of the output signal, which data describes the temporal variation of the output signal, wherein the frequency and/or the time at which the maximum of the amplitude of the vibration is reached, are determined on the basis of the digital measurement data. The output signal is in this case preferably converted by an analog-to-digital converter, the conversion rate of which is greater, for instance at least by a factor of 3 or 5 or 10 greater, than a dominant frequency of the test excitation signal or of the measurement excitation signal, or than the determined frequency or than a resonant frequency to be determined. Digitally processing the measurement data makes it possible, for instance, to determine particularly easily an envelope of the output signal and hence the maximum of the amplitude. In addition, a power density spectrum for the analysis interval or for sub-intervals of the analysis interval can be determined with little effort, for instance by a Fourier transform, in particular a fast Fourier transform, whereby it is easily possible to determine the dominant frequency as the maximum of the power density spectrum. The acquisition of the digital measurement data can start, for instance, at the end of excitation of the wave, or shifted in relation thereto by a defined time interval.

The frequency can be determined by determining a maximum of the power density spectrum of the output signal in the analysis interval, or by analyzing time intervals between crossovers of the output signal to above and/or below a defined limit value within the analysis interval. The analysis can be carried out on the digital measurement data as explained above. In this case, a power density spectrum can be generated by a Fourier transform. It is also easily possible in digital measurement data to determine intervals between zero crossovers or other crossovers to above or below a limit value. It is also possible, however, to determine the time intervals between crossovers to above and/or below a defined limit value, in particular time intervals between zero crossovers, without a preceding analog-to-digital conversion, for instance by means of a frequency counter, a period measurement or generally a time-to-digital converter.

The control device can determine an envelope or an instantaneous signal amplitude of the output signal, wherein the start and/or the end of the analysis interval depend on the envelope or the instantaneous signal amplitude. In particular, the maximum or minimum of the output signal or of the digital measurement data between every two crossovers to above and/or below the limit value, so in particular between every two zero crossovers, can be determined as the instantaneous signal amplitude. An envelope can be determined, for example, by low-pass filtering the squared, or otherwise rectified, output signal or the correspondingly processed digital measurement data.

The analysis interval can start in particular at the maximum of the amplitude of the vibration or at a defined time after this maximum, wherein the maximum can be determined from the signal amplitude envelope or the instantaneous signal amplitude. The end of the analysis interval can be selected such that the instantaneous signal amplitude or the envelope at the end of the analysis interval drops below a defined limit value. The described selection of the start of the analysis interval can achieve, as already explained, that the spectrum of the test excitation signal has no influence, or only a minor influence, on the determined frequency. The described selection of the end of the analysis interval can be advantageous for excluding from the frequency determination, time intervals in which the output signal, or in which the digital measurement data, is dominated by noise.

By virtue of the fact that in the method according to the invention for frequency determination, only the analysis interval is taken into account rather than the entire output signal, it is possible to reduce substantially even at this stage any influence of the spectrum of the test excitation signal on the determined frequency, as already explained. Nonetheless, it can be disadvantageous to the accuracy of the frequency determination if a dominant frequency of the test excitation signal lies very close to the frequency to be determined. In addition, it should be avoided that the frequency to be determined lies at a minimum of the power density spectrum, because this can make it harder to identify the resonant frequency.

Therefore in the method according to the invention, a measuring device can be used in which the amplitude of the output signal for a given amplitude of the test excitation signal exhibits a local maximum for at least one resonant frequency. The test excitation signal is a periodic signal amplitude-modulated by an envelope. The resonant frequency and the excitation frequency of the periodic signal differ by at least 1% or at least 3% of the resonant frequency, and/or the excitation frequency and the envelope are selected such that the minima of the power density spectrum of the test excitation signal are offset from the resonant frequency by at least 1% or at least 3% of the resonant frequency. Preferably, the resonant frequency and the excitation frequency of the periodic signal can differ by 5% of the resonant frequency or more, and/or the minima of the power density spectrum of the test excitation signal can be offset from the resonant frequency by 5% or more of the resonant frequency.

If a measuring device is used in which the amplitude of the output signal would exhibit a local maximum for at least one additional resonant frequency or dominant frequency if white noise were used as the excitation signal. The test excitation signal is a periodic signal amplitude-modulated by an envelope, it can be advantageous to select the envelope such that the frequency spectrum of the test excitation signal exhibits a local minimum at the additional resonant frequency or the dominant frequency. For example, for a rectangular or pulse-shaped envelope, the width of the pulse can be selected such that this is the case. If the frequency spectrum of the test excitation signal exhibits a minimum for a frequency, then this frequency is also suppressed in the output signal. It is thereby possible to prevent additional, unwanted resonances or dominant frequencies from contributing to causing errors in the detected frequency or the resonant frequency.

For ultrasonic transducers, the resonant frequency may lie in the region of 1 MHz, for instance may lie at 1.05 MHz. Therefore the stated offsets can be, for example, at least 10 kHz, at least 30 kHz, or 50 kHz or more. The resonant frequency can preferably be that frequency that is meant to be determined as the determined frequency in the method according to the invention. For a given amplitude of the test excitation signal, the amplitude of the output signal can exhibit in particular a global maximum at the resonant frequency. It is also possible, however, that the measurement path or the, or the additional vibration transducer, has a plurality of resonant frequencies, wherein, for example, the excitation is meant to take place at a resonant frequency at which no global maximum exists.

A sufficient offset of the minima of the power density spectrum of the test excitation signal from the resonant frequency can be achieved, for instance, by a main maximum of the power density spectrum of the test excitation signal being relatively wide, and, for example, having a width of at least 10% or at least 20% or at least 30% of the resonant frequency.

At most 25 or at most 15 or at most 10 periods of the periodic signal can lie within the envelope. For example, 6 or 12 periods of the periodic signal can lie within the envelope. A large width of the main maximum of the power density spectrum of the test excitation signal is achieved by using a relatively short envelope. In particular, the amplitude of the test excitation signal can be zero outside the stated length of the envelope. A square-wave function can be used as the envelope, with the result that, for instance, the stated number of periods of the periodic signal is output without additional amplitude modulation, whereas no signal is output before and after this number of periods. The periodic signal may be a sine wave, for example.

A measurement excitation frequency of the measurement excitation signal can be read from a lookup table on the basis of the determined frequency. By defining a suitable lookup table, it is possible to eliminate systematic errors in the determination of the frequency, for instance of a resonant frequency. Likewise, using a suitable lookup table makes it possible to ensure deliberately that excitation takes place at a defined position in relation to a resonant frequency, if this is desired. Alternatively, the determined frequency could be used directly as the measurement excitation frequency, and/or the determined frequency could be scaled and/or an offset could be added in order to determine the measurement excitation frequency.

The invention relates, in addition to the method according to the invention, to a measuring device for determining a fluid variable relating to a fluid and/or to a fluid flow of the fluid, which contains a measuring container for holding the fluid, and contains a vibration transducer arranged on the measuring container, and a control device, wherein the measuring device is configured to perform the method according to the invention. In particular, the vibration transducer can be configured and arranged on the measuring container in such a way that in the event of excitation by a test excitation signal from the control device, a wave is excited in the fluid that is guided along a propagation path back to the vibration transducer or to at least one additional vibration transducer of the measuring device, which additional vibration transducer is arranged on the measuring container, thereby exciting the, or the additional, vibration transducer to vibrate. The control device can be configured in particular to control the vibration transducer in accordance with the method according to the invention, and to acquire the output signal of the, or the additional, vibration transducer and process said output signal in accordance with the method according to the invention.

The features described in relation to the method according to the invention can be used to develop the measuring device such that it has the advantages defined in association with the method, and vice versa.

Other features which are considered as characteristic for the invention are set forth in the appended claims.

Although the invention is illustrated and described herein as embodied in a method for operating a measuring device used to determine a fluid variable, and measuring device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
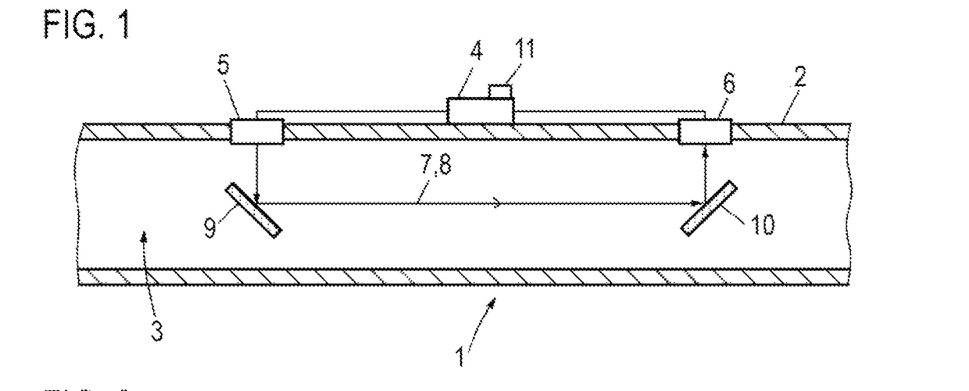
FIG. 1 is an illustration showing an exemplary embodiment of a measuring device according to the invention.

Referring now to the figures of the drawings in detail and first, particularly to FIG. 1 thereof, there is shown a measuring device 1 which is used to determine a fluid variable, in particular a flow rate of a fluid through a measuring container 3 carrying the fluid. A vibration transducer 5 and an additional vibration transducer 6 are arranged on a side wall 2 of the measuring container 3. A control device 4 can supply the vibration transducers 5, 6 with an associated excitation signal in order to excite the transducers to vibrate and thereby to excite a wave 7 in each case, as shown in FIG. 1 for the vibration transducer 5. The wave 7 excited by the vibration transducer 5 is guided along a propagation path 8 to the additional vibration transducer 6, and in reverse. The particular vibration transducer 5, 6 at which the wave 7 is incident is excited to vibrate. The particular vibration transducer 5, 6 thereby provides an output signal which relates to the vibration and is acquired by the control device 4. The wave 7 is guided along the propagation path 8 by ultrasound mirrors 9, 10. Alternatively, it would also be possible, for instance, to use vibration transducers 5, 6 which beam the wave 7 diagonally into the measuring container 3, whereby it may be possible to dispense with the ultrasound mirrors 9, 10. In another embodiment, it would also be possible for the vibration transducers 5, 6, instead of exciting a suitable wave directly in the fluid, to excite initially the side wall 2 to vibrate, which in turn excites the wave 7.

The measuring device 1 shown can be used, for example, to determine a flow velocity and hence a flow rate of the fluid 3 by analyzing a transit-time difference for the wave 7 for propagation from the vibration transducer 5 to the additional vibration transducer 6 and in reverse. The procedure described below can also be used in measuring devices that are intended to determine other fluid properties, for instance a fluid type by measuring the speed of sound. It is also possible in this case, for example, for the wave 7 to be guided from the vibration transducer 5 along a propagation path (not shown) back to this transducer, so that an additional vibration transducer 6 is not required. This would be possible in the example shown in FIG. 1, for instance, by dispensing with the ultrasound mirror 9, whereby the wave 7 is reflected by the opposite side wall 2 back to the vibration transducer 5.

In order to achieve a high measurement quality with low energy consumption, it is advantageous if a measurement excitation signal, which is used to drive the vibration transducers 5, 6 as part of determining the fluid variable, has a dominant frequency that equals a resonant frequency of the system or of the vibration transducers 5, 6, thereby resulting in a particularly large amplitude of the output signal for a given excitation power. Since this frequency typically depends on the operating parameters, for instance the temperature, and also may differ between different measuring devices as a result of component tolerances, or may change as ageing of the measuring device progresses, it is advantageous to determine a corresponding frequency in certain operating situations or regularly during operation of the measuring device 1. A corresponding method implemented by the control device 4 is explained in more detail below with reference to FIG. 2.

Figure 2:
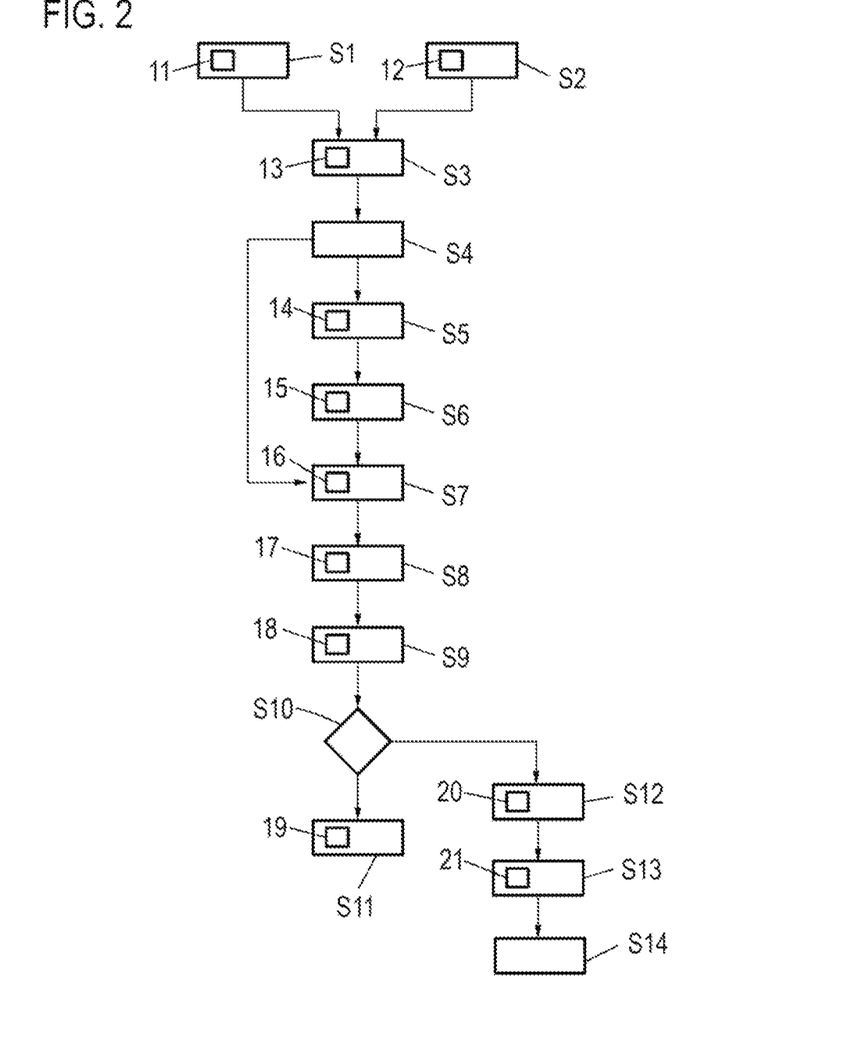
FIG. 2 is a flow diagram showing an exemplary embodiment of the method according to the invention.

In Step S1, first a periodic signal 11, for instance a sine wave, is generated at a defined frequency. The frequency of the periodic signal is selected such that it has a certain offset from a supposed resonant frequency, although is not offset too far therefrom. For instance, the frequency of the periodic signal may differ from the supposed resonant frequency by between 1% and 10% of the supposed resonant frequency.

In step S2, an envelope 12 is generated, which is used in step S3 for amplitude-modulation of the periodic signal 11 in order to provide a test excitation signal 13. In the simplest case, the envelope 12 may be a square-wave function, with the result that the test excitation signal 13 can correspond to, for example, a defined number of periods of the period signal 11. Other envelopes 12, which can also be referred to as window functions, are possible as well, however, for instance a cosine-squared function, a trapezoidal envelope, or the like. A relatively short envelope 12 is preferably used. This results in a wide frequency spectrum and hence robust excitation of the resonant frequency even if the periodic signal is significantly detuned from the resonant frequency.

In step S4, the control device 4 outputs the test excitation signal 13 to the vibration transducer 5 in order to excite this transducer to vibrate. The wave 7 is thereby excited in the fluid and, as explained above, guided along the propagation path 8 to the additional vibration transducer 6, thereby exciting vibrations of the additional vibration transducer 6.

In step S5, the control device 4 acquires an output signal 14 which is provided as a result of these vibrations by the additional vibration transducer 6. In particular in step S6, an analog-to-digital conversion of the output signal 14 can take place in order to provide digital measurement data 15. Optionally, this step can also be omitted, however, and the further steps for signal processing can be performed in analog form.

In step S7, an analysis interval 16 for the output signal 14 or for the digital measurement data 15 is determined, for which interval in particular the resonant frequency discussed above is meant to be determined. In order to prevent the spectral composition of the test excitation signal 13 from causing errors in the determination of the frequency, the analysis interval 16 is selected such that it does not start until after excitation of the wave 7 in step S4 has finished. This can be implemented easily, for instance, by the control device 4 setting a suitable time marker. Additionally or alternatively, for the same purpose, the analysis interval 16 can be selected such that it starts only on, or after, a maximum of the amplitude of the vibration or of the output signal 14 or of the digital measurement data 15 is reached. For example, a maximum amplitude can be determined by calculating an envelope. The end of the analysis interval 16 is preferably selected such that at this point in time, the amplitude or the envelope of the output signal 14 or of the digital measurement data 15 drops below a defined limit value. It is hence possible to exclude time intervals in which the output signal is primarily characterized by noise.

In step S8, the analysis interval 16 or a sub-interval thereof is Fourier-transformed, in particular by a fast Fourier transform, in order to obtain a power density spectrum of the output signal 14 in the analysis interval 16. In step S9, the frequency 18 can then be determined in particular as a global or local maximum of the power density spectrum 17.

As explained above, the determined frequency 18 is a good measure for the resonant frequency of the measurement system or of the vibration transducers 5, 6. A severe or sudden change in the determined frequency 18 can indicate severe ageing or damage to the vibration transducers 5, 6 or to other components of the measuring device 1, and hence, for example, the need to service or perform maintenance on the measuring device 1. Therefore a check can be performed in step S10 to ascertain whether a trigger condition is fulfilled, which may be fulfilled, for example, when the frequency 18 lies outside a defined target range, or the deviation from a target value exceeds a limit value. Alternatively or additionally, it would also be possible by means of the trigger condition to analyze a temporal variation in the frequency 18 for a plurality of temporally spaced determinations. For example, this can be used to identify step changes in the frequency 18 or suchlike that may indicate, for instance, a crack or other damage to the vibration transducers 5, 6.

If the trigger condition is fulfilled in step S10, then a notification 19 or else an error message can be output in step S11. A notification device 11 of the measuring device, for instance a display, loudspeaker or the like, can be used for this purpose. It is particularly preferable that additionally or alternatively, the notification or error message is wirelessly transmitted to a system, which can store, manage and visualize all the meter data from a system operator or water supply network. An example of such a system is the IZAR portal from the company Diehl Metering. Alternatively, it would also be possible to transmit a suitable notification for instance wirelessly to a mobile communication device of a user.

If it is ascertained in step S10 that the trigger condition is not fulfilled, the measuring device 1 is configured instead to continue operation. As an alternative to the exemplary embodiment shown, it would also be possible in this context for steps S12 to S14 described below also to be performed additionally when the trigger condition in step S10 is fulfilled. For example, the measuring device 1 can initially continue to be operated normally until servicing can take place.

In step S12, a measurement excitation frequency 20 is determined on the basis of the determined frequency 18. A lookup table, for example, can be used for this purpose in order to correct for systematic errors as part of determining the frequency 18 and/or to ensure deliberately that the measuring device operates at a frequency that differs from the resonant frequency. In step S13, a measurement excitation signal 21 is then generated, the dominant frequency of which equals the measurement excitation frequency 20. This can be implemented, for example, by the measurement excitation signal 21 being a periodic signal which has the measurement excitation frequency 20 and is amplitude-modulated by an envelope.

In step S14, the measurement excitation signal 21 is used to drive the vibration transducers 5 and/or 6 in order to determine the fluid variable. For example, the measurement excitation signal 21 can be used to determine the respective waves 7 as part of determining, as explained above, a transit-time difference between the vibration transducers 5, 6, in order to determine a flow rate. Apart from using the measurement excitation signal 21 having the measurement excitation frequency 20 determined as described above, the procedure here can correspond to the procedure known from the prior art for determining a transit-time difference, and therefore will not be explained in further detail.

Alternatively or additionally, the knowledge about a modified resonant frequency could also be used to determine as part of the measurement, correction factors, in particular empirically obtained correction factors, for determining the fluid variable. This can be implemented, for instance, by means of a lookup table.

Figure 3:
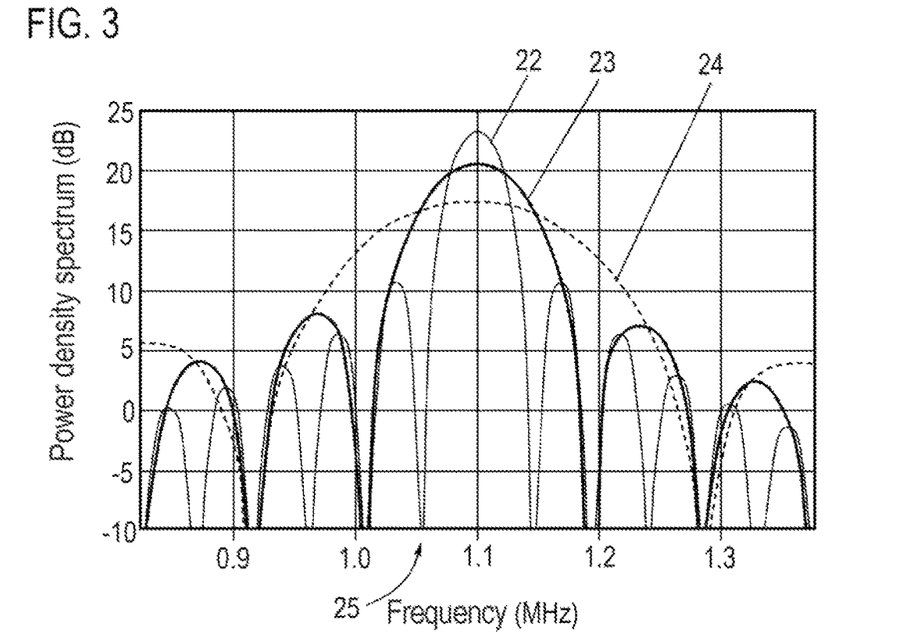
FIG. 3 is a graph showing a power density spectra for different test excitation signals which can be used in an exemplary embodiment of the method according to the invention.

The drive data and signals provided and/or processed by the control device 4 are explained below in greater detail with reference to several examples. FIG. 3 shows power density spectra 22, 23, 24 for three different usable test excitation signals 13. The periodic signal 11 of the test excitation signals 13 is in all three cases a sine wave of frequency 1.1 MHz. A square-wave function is used as the envelope 12 in each case, the length of which is selected such that twenty-four vibration periods are output in the case of the power density spectrum 22, twelve vibration periods are output in the case of the power density spectrum 23, and six vibration periods of the sine wave are output in the case of the power density spectrum 24. Outputting fewer vibration periods leads to widening of the maximum of the associated power density spectrum 22, 23, 24. Using relatively few vibration periods is typically advantageous in this context. If a relatively large number of vibration periods are output, as in the example for the power density spectrum 22, then a relatively large number of minima 25 may result in the region of the resonant frequency being sought, which may interfere with determining the resonant frequency, as will be explained in more detail later.

Figure 4:
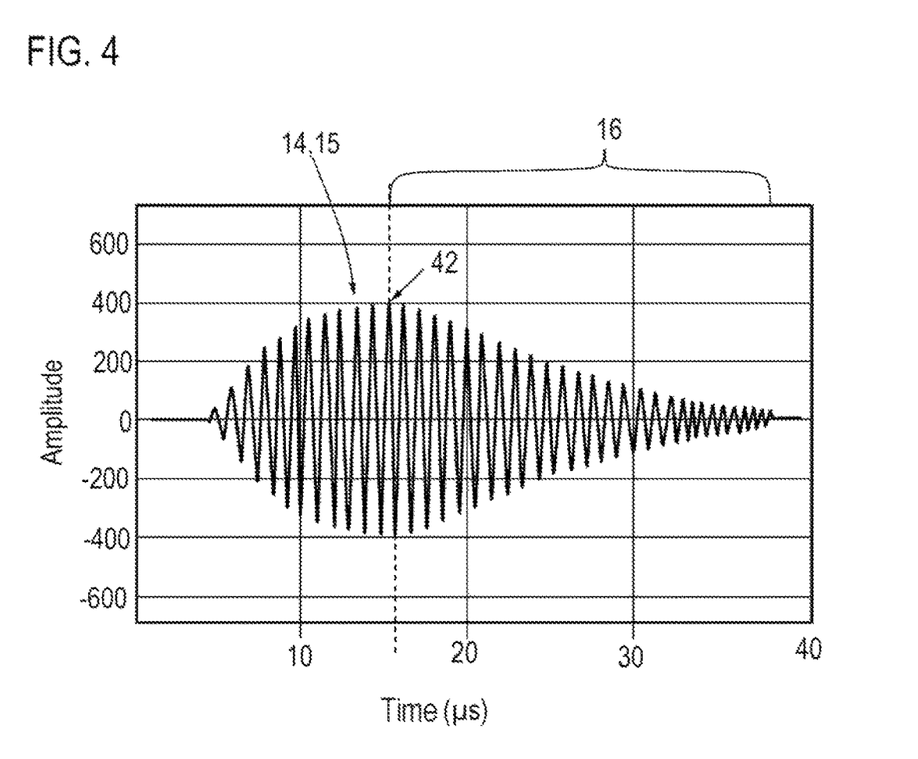
FIG. 4-7 are graphs showing measurement and processing data obtained in exemplary embodiments of the method according to the invention.

FIG. 4 shows an example of an output signal 14 acquired by the additional vibration transducer 6, or digital measurement data 15 representing the output signal 14. In this case, a test excitation signal 13 having the power density spectrum 23 has been used, i.e. having a dominant frequency of 1.1 MHz and 12 vibration periods. As long as the vibration of the additional vibration transducer 6 is forcibly excited, the amplitude of the output signal 14 initially rises. Since Eigen or resonant frequencies of the system are meant to be determined, as explained above, an analysis interval 16 is selected that does not start until after the maximum 42 of the amplitude of the output signal 14.

Figure 5:
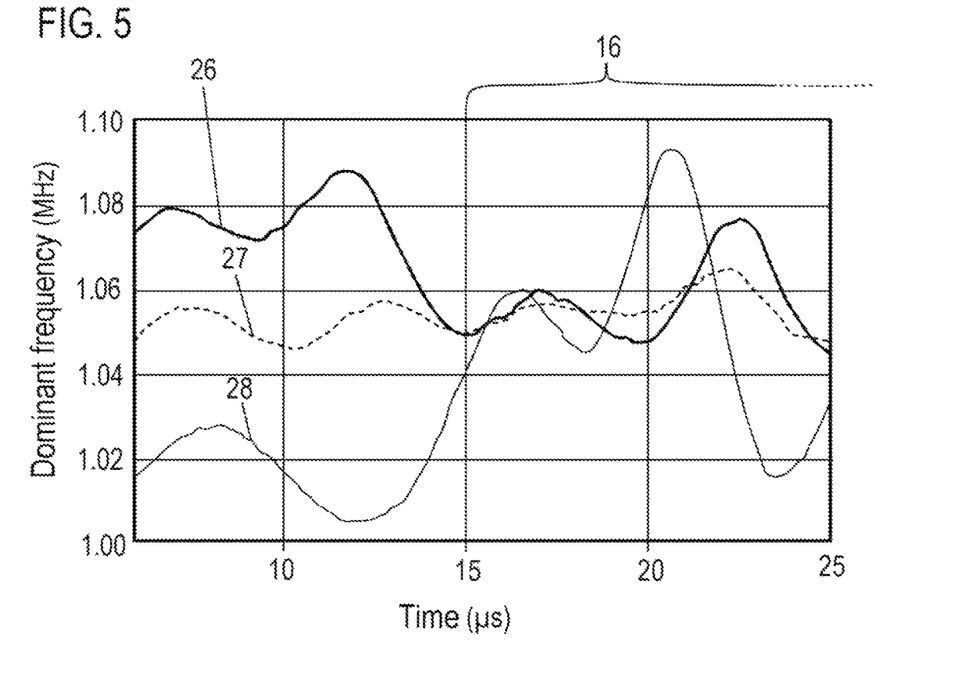

The consequences of the choice of analysis interval 16 are explained in greater detail below with reference to FIG. 5. FIG. 5 shows the temporal variation 26, 27, 28 of the respective dominant frequencies of the output signal 14 for different dominant frequencies of an associated test excitation signal 13. The temporal variation 26 here corresponds to a segment of a short-time Fourier transform of the output signal 14 shown in FIG. 4, that results from a dominant frequency of the test excitation signal 13 of 1.1 MHz. The dominant frequency of the test excitation signal 13 was 1.05 MHz for the temporal variation 27, and 1.0 MHz for the temporal variation 28. The resonant frequency lies slightly above 1.05 MHz. The relatively strong quasi-periodic oscillation of the temporal variations 26, 27, 28, which is clearly visible in FIG. 5, results primarily from the relatively short window used for the associated short-time Fourier transform. For longer transform windows, a far smaller variation in the determined dominant frequency over time is obtained. Irrespective of this, however, it is possible to distinguish clearly in FIG. 5 between a time interval before reaching the maximum 42 of the vibration amplitude and thus before the analysis interval 16, and the variation within the analysis interval 16. Before the start of the analysis interval 16, for each of the variations 26, 27, 28 for which the dominant frequency of the test excitation signal 13 differs significantly from the resonant frequency, a frequency is determined as the dominant frequency that lies between the dominant frequency of the test excitation signal 13 and the resonant frequency. Thus robust determination of the resonant frequency is scarcely possible as long as a forced vibration is detected at the vibration transducer 6. In the region of the maximum 42 of the amplitude of the output signal 14, i.e. at, or shortly before, the start of the analysis interval, the temporal variations 26, 27, 28 of the dominant frequency converge towards the resonant frequency, however, so that within the analysis interval 16, the same dominant frequency, namely the resonant frequency, is determined largely independently of the dominant frequency of the test excitation signal 13.

Figure 6:
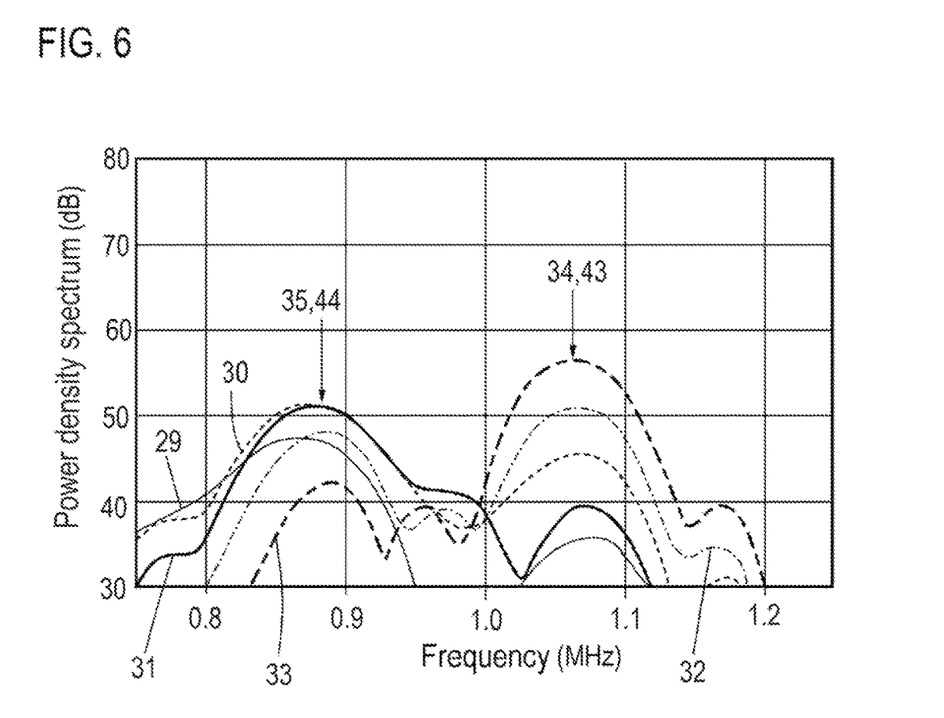

If solely the dominant frequency is considered, care should be taken to ensure that the dominant frequency of the test excitation signal 13 does not get too close to another resonant frequency. If this is the case, then although a local maximum 43 still results for the resonant frequency 34 in the power density spectrum, as is shown in FIG. 6, it may be the case that the global maximum 44 lies at an additional resonant frequency 35. FIG. 6 shows by way of example a power density spectrum 29 of an output signal 14 that results for excitation at a dominant frequency of 800 kHz, a power density spectrum 30 of an output signal 14 that results for excitation at a dominant frequency of 850 kHz, a power density spectrum 31 of an output signal 14 that results for excitation at a dominant frequency of 900 kHz, a power density spectrum 32 of an output signal 14 that results for excitation at a dominant frequency of 950 KHz, and a power density spectrum 33 of an output signal 14 that results for excitation at a dominant frequency of 1.2 MHz. As can be seen, a global maximum 43 at the resonant frequency 34 being sought results only for the power density spectra 32 and 33. The dominant frequencies in the excitation for the power spectra 29, 30, 31 lie considerably closer to the additional resonant frequency 35, with the result that most of the energy of the excitation excites vibrations at this frequency. As is also evident in FIG. 6, however, at least a local maximum 43 at the resonant frequency 34 results even for these power density spectra 29, 30, 31, so that even when using a test excitation signal 13 having relatively low frequencies, the resonant frequency 34 can be located by taking into account also local maxima 43, 44, or by taking into account only maxima 43, 44 in a specific frequency range, for instance above 1 MHz.

Figure 7:
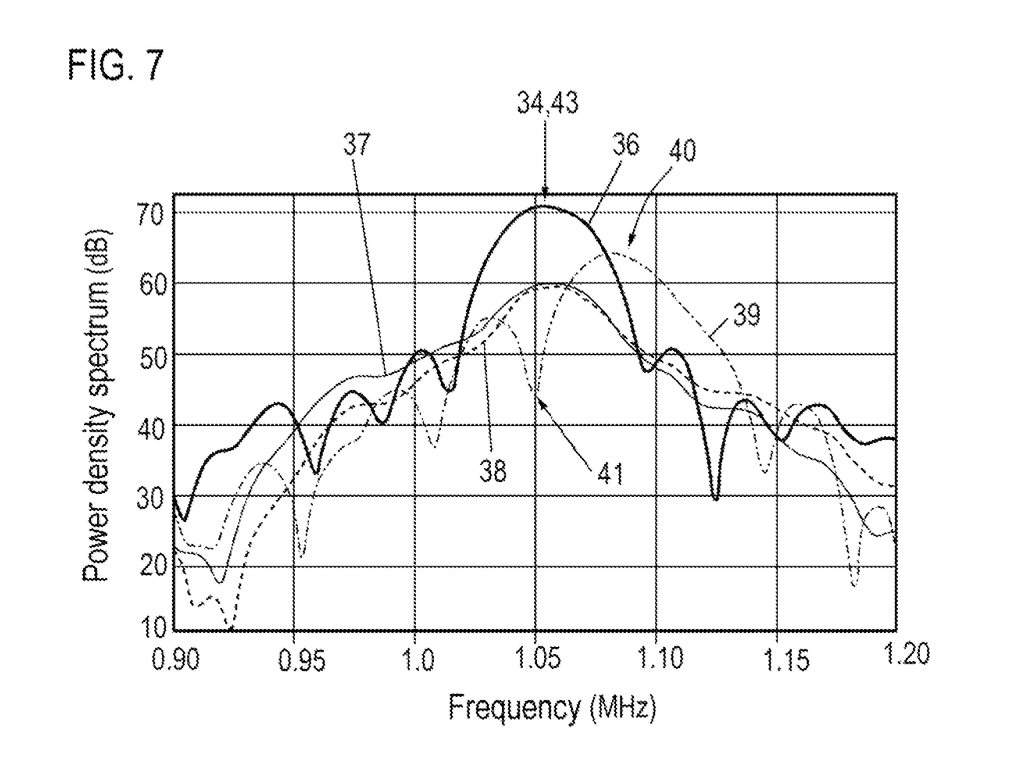

The described procedure, in which a frequency to be determined is determined for an analysis interval 16, in which forced excitation of the additional vibration transducer 6 has already finished, largely eliminates an influence of the spectrum of the test excitation signal 13 on the determination of the frequency 18, as already explained. It should be avoided here, however, that the frequency to be determined lies at a minimum of the power density spectrum of the test excitation signal 13. This is explained below in detail with reference to FIG. 7. FIG. 7 shows four power density spectra 36, 37, 38, 39 of output signals 14 resulting from different test excitation signals 13. In this case, the dominant frequency or the frequency of the periodic signal 11 of the test excitation signal 13 is 1.05 MHz for each of the obtained power density spectra 36 and 37, i.e. is very close to the resonant frequency. The power density spectra 38, 39, in contrast, were obtained for an excitation frequency of the periodic signal 11 of 1.1 MHz. In the case of the power spectra 36, 39, the envelope is selected such that 24 cycles of the periodic signal are output. In obtaining the power density spectra 37 and 38, only 6 cycles of the associated periodic signal 11 were output in each case.

Whereas the power density spectra 36, 37, 38 all exhibit, as expected, a maximum 43 in the region of the resonant frequency 34, the maximum 40 of the power density spectrum 39 is shifted sharply with respect to the resonant frequency 34, and a local minimum 41 of the power density spectrum 39 can be seen close to the resonant frequency 34. This initially unexpected behavior is easily explained if the power density spectrum 22 of the test excitation signal 13 shown in FIG. 3 is considered, which is used to obtain the power density spectrum 39 or the associated output signal 14. This likewise exhibits a minimum 25 at the position of the minimum 41, and therefore as a result of the power density spectrum 22, the test excitation signal 13 can input essentially no energy as regards a vibration at the resonant frequency 34.

In order to avoid this problem and thus potentially incorrectly identifying the frequency 18 being sought, it is expedient to achieve a relatively wideband excitation, or at least a relatively wide first maximum of the power spectrum of the test excitation signal 13, by using a short envelope 12, so that, for example, only 6 cycles or fewer cycles even of the periodic signal 11, for example of a sine wave, are output.

LIST OF REFERENCES 1 measuring device
2 side wall
3 measuring container
4 control device
5 vibration transducer
6 vibration transducer
7 wave
8 propagation path
9 ultrasound mirror
10 ultrasound mirror
11 signal
12 envelope
13 test excitation signal
14 output signal
15 measurement data
16 analysis interval
17 power density spectrum
18 frequency
19 notification
20 measurement excitation frequency
21 measurement excitation signal
22 power density spectrum
23 power density spectrum
24 power density spectrum
25 minima
26 variation
27 variation
28 variation
29 power density spectrum
30 power density spectrum
31 power density spectrum
32 power density spectrum
33 power density spectrum
34 resonant frequency
35 resonant frequency
36 power density spectrum
37 power density spectrum
38 power density spectrum
39 power density spectrum
40 maximum
41 minimum
42 maximum
43 maximum
44 maximum
S1-S14 step

The invention claimed is:

1. A method for operating a measuring device used to determine a fluid variable relating to a fluid and/or to a fluid flow of the fluid, the measuring device containing a measuring container that holds the fluid and/or through which the fluid flows, a control device, and a vibration transducer disposed on the measuring container, which comprises the steps of:

driving, via the control device of the measuring device, the vibration transducer to excite a wave in the fluid by means of a test excitation signal;

guiding the wave along a propagation path back to the vibration transducer or to at least one additional vibration transducer of the measuring device, the additional vibration transducer disposed on the measuring container, thereby exciting the vibration transducer or the additional vibration transducer to vibrate;

acquiring, via the control device, an output signal relating to a vibration and determining a frequency of that segment of the output signal that lies in an analysis interval, wherein the analysis interval starts once the driving of the vibration transducer to excite the wave has finished, and/or once a maximum of an amplitude of the vibration is reached or exceeded;

performing a determination of the fluid variable on a basis of the frequency determined, and/or wherein, on a trigger condition being fulfilled, a fulfilment of which depends on the frequency determined; and outputting an error message or a notification to a user and/or to a device external to the measuring device, and/or placing the measuring device in a fault condition in which a determining of the fluid variable is not performed;

wherein:

the measuring device is used in which an amplitude of the output signal for a given amplitude of the test excitation signal exhibits a local maximum for at least one resonant frequency;

the test excitation signal is a periodic signal amplitude-modulated by an envelope;

the at least one resonant frequency and an excitation frequency of the periodic signal differ by at least 1% or at least 3% of the at least one resonant frequency; and the excitation frequency and the envelope are selected such that minima of a power density spectrum of the test excitation signal are offset from the at least one resonant frequency by at least 1% or at least 3% of the at least one resonant frequency.

2. The method according to claim 1, wherein the determination of the fluid variable depends on the frequency determined in that a measurement excitation signal, which the control device outputs to the vibration transducer, or the additional vibration transducer as part of determining the fluid variable, is defined on a basis of the frequency determined.

3. The method according to claim 1, wherein the control device determines digital measurement data on a basis of the output signal, the digital measurement data describes a temporal variation of the output signal, wherein the frequency and/or a time at which the maximum of the amplitude of the vibration is reached, are determined on a basis of the digital measurement data.

4. The method according to claim 1, which further comprises determining the frequency by determining a maximum of a power density spectrum of the output signal in the analysis interval, or by analyzing time intervals between crossovers of the output signal to above and/or below a defined limit value within the analysis interval.

5. The method according to claim 1, wherein the control device determines an envelope or an instantaneous signal amplitude of the output signal, wherein a start and/or an end of the analysis interval depends on the envelope or the instantaneous signal amplitude.

6. The method according to claim 1, wherein at most 25 periods of the periodic signal lie within the envelope.

7. The method according to claim 1, wherein the measuring device is used in which an amplitude of the output signal would exhibit a local maximum for at least one additional resonant frequency or dominant frequency if white noise were used as an excitation signal, wherein the envelope is selected such that a frequency spectrum of the test excitation signal exhibits a local minimum at an additional resonant frequency or a dominant frequency.

8. The method according to claim 1, which further comprises reading a measurement excitation frequency of the measurement excitation signal from a lookup table on a basis of the frequency determined.

9. The method according to claim 1, wherein at most 15 periods of the periodic signal lie within the envelope.

10. The method according to claim 1, wherein at most 10 periods of the periodic signal lie within the envelope.

11. A measuring device for determining a fluid variable relating to a fluid and/or to a fluid flow of the fluid, the measuring device comprising:
a measuring container for holding the fluid;
a vibration transducer disposed on said measuring container; and
a control device;
the measuring device is configured to:
drive, via said control device, said vibration transducer to excite a wave in the fluid by means of a test excitation signal;
guide the wave along a propagation path back to said vibration transducer, thereby exciting said vibration transducer to vibrate;
acquire, via said control device, an output signal relating to a vibration and determining a frequency of that segment of the output signal that lies in an analysis interval, wherein the analysis interval starts once a driving of said vibration transducer to excite the wave has finished, and/or once a maximum of an amplitude of the vibration is reached or exceeded;
perform a determination of the fluid variable on a basis of the frequency determined, and/or wherein, on a trigger condition being fulfilled, a fulfilment of which depends on the frequency determined; and
output an error message or a notification to a user and/or to a device external to the measuring device, and/or placing the measuring device in a fault condition in which a determining of the fluid variable is not performed;
wherein:
said measuring device is used in which an amplitude of said output signal for a given amplitude of the test excitation signal exhibits a local maximum for at least one resonant frequency;
said test excitation signal is a periodic signal amplitude-modulated by an envelope;
said at least one resonant frequency and an excitation frequency of the periodic signal differ by at least 1% or at least 3% of said at least one resonant frequency; and
said excitation frequency and said envelope are selected such that minima of a power density spectrum of said test excitation signal are offset from said at least one resonant frequency by at least 1% or at least 3% of said at least one resonant frequency.

12. A method for operating a measuring device used to determine a fluid variable relating to a fluid and/or to a fluid flow of the fluid, the measuring device containing a measuring container that holds the fluid and/or through which the fluid flows, a control device, and a vibration transducer disposed on the measuring container, which comprises the steps of:
driving, via the control device of the measuring device, the vibration transducer to excite a wave in the fluid by means of a test excitation signal;
guiding the wave along a propagation path back to the vibration transducer or to at least one additional vibration transducer of the measuring device, the additional vibration transducer disposed on the measuring container, thereby exciting the vibration transducer or the additional vibration transducer to vibrate;
acquiring, via the control device, an output signal relating to a vibration and determining a frequency of that segment of the output signal that lies in an analysis interval, wherein the analysis interval starts once the driving of the vibration transducer to excite the wave has finished, and/or once a maximum of an amplitude of the vibration is reached or exceeded;
performing a determination of the fluid variable on a basis of the frequency determined, and/or wherein, on a trigger condition being fulfilled, a fulfilment of which depends on the frequency determined; and
outputting an error message or a notification to a user and/or to a device external to the measuring device, and/or placing the measuring device in a fault condition in which a determining of the fluid variable is not performed;
wherein:
the measuring device is used in which an amplitude of the output signal would exhibit a local maximum for at least one additional resonant frequency or dominant frequency if white noise were used as an excitation signal;
the test excitation signal is a periodic signal amplitude-modulated by an envelope; and
the envelope is selected such that a frequency spectrum of the test excitation signal exhibits a local minimum at an additional resonant frequency or a dominant frequency.

* * * * *